(12) United States Patent
Moore

(10) Patent No.: US 7,946,115 B2
(45) Date of Patent: May 24, 2011

(54) HYDRAULIC CYLINDER FOR A BRAKE SYSTEM

(76) Inventor: Wayne Ian Moore, Changhua (TW)

( * ) Notice: Subject to any disclaimer, the term of this patent is extended or adjusted under 35 U.S.C. 154(b) by 511 days.

(21) Appl. No.: 12/132,589

(22) Filed: Jun. 3, 2008

(65) Prior Publication Data

US 2009/0293715 A1    Dec. 3, 2009

(51) Int. Cl.
*B60T 11/00*    (2006.01)
*B60T 13/00*    (2006.01)
(52) U.S. Cl. .......................................... 60/547.1; 60/562
(58) Field of Classification Search ................ 60/574, 60/588, 594; 92/130 R; 188/26, 344
See application file for complete search history.

(56) References Cited

U.S. PATENT DOCUMENTS

| | | | | |
|---|---|---|---|---|
| 3,802,199 A | * | 4/1974 | Hagberg, Jr. | 60/574 |
| 4,496,033 A | * | 1/1985 | Hall et al. | 188/347 |
| 6,435,318 B1 | * | 8/2002 | Chen | 188/344 |
| 2006/0185360 A1 | * | 8/2006 | Takizawa et al. | 60/547.1 |

\* cited by examiner

*Primary Examiner* — Thomas E Lazo

(57) ABSTRACT

A hydraulic cylinder for a brake system includes a cylindrical body and a piston. The cylindrical body has a receiving space longitudinally defined therein for movably and sealingly receiving the piston. The receiving space is divided into a first chamber and a second chamber diametrically smaller than the first chamber. The piston has a first portion and a second portion. The first portion and the second portion sealingly and movably abut against the first chamber and the second chamber respectively. In a speed reduction stage the first portion interacts with the first chamber, and in an emergency brake stage the first portion and the second portion interact with the first chamber and the second chamber respectively for providing a greater braking force than in the speed reduction stage.

7 Claims, 7 Drawing Sheets

HYDRAULIC CYLINDER FOR A BRAKE SYSTEM

BACKGROUND OF THE INVENTION

1. Field of the Invention

The present invention relates to a hydraulic cylinder, and more particularly to a hydraulic cylinder for a brake system, in that an effect of a speed reduction stage and an emergency brake stage is acquired.

2. Description of Related Art

A conventional hydraulic brake system in accordance with the prior art comprises a hydraulic lever assembly and a hydraulic caliper assembly connected with the lever assembly by an oil tube. The lever assembly is mounted on a handle bar of a bicycle/motorcycle and the caliper assembly is mounted on a frame or a fork of the bicycle/motorcycle. By the connection of the oil tube, the oil is communicating between the lever assembly and the caliper assembly. The lever assembly includes a first cylinder and a brake lever connected to the first cylinder having a first cylindrical body and a first piston disposed therein. The caliper assembly includes a second cylinder having a second cylindrical body and a second piston disposed therein. When pulling the brake lever so that the first piston is driven, the oil pressure in the first cylinder is transferred to the second cylinder. Therefore the second piston is driven to push a brake shoe to a disk/rotor for braking purpose. However it still has the problem that a greater braking force is provided in an emergency brake so that it is possible to over brake such that the rider can be thrown over the front wheel or the wheels are locked. Therefore the bicycle/motorcycle is out of control and leads the rider to serious injury potentially.

The present invention has arisen to mitigate and/or obviate the disadvantages of the conventional hydraulic brake system.

SUMMARY OF THE INVENTION

The main objective of the present invention is to provide an improved hydraulic cylinder for a brake system, in that a multi-stage and economical hydraulic cylinder is acquired.

To achieve the objective, the hydraulic cylinder for the brake system includes a cylindrical body and a piston. The cylindrical body has a receiving space longitudinally defined therein for movably and sealingly receiving a piston. The receiving space is divided into a first chamber and a second chamber diametrically smaller than the first chamber. The piston has a first portion and a second portion. The first portion and the second portion sealingly and movably abut against the first chamber and the second chamber respectively. In a speed reduction stage oil is fed into a first space between the first chamber and the first portion for pushing the piston outward to achieve the purpose of slowing down, and in an emergency brake stage oil is fed into the first space and a second space between the second chamber and the second portion for providing a greater braking force than in the speed reduction stage to achieve the purpose of emergent braking.

Further benefits and advantages of the present invention will become apparent after a careful reading of the detailed description with appropriate reference to the accompanying drawings.

DETAILED DESCRIPTION OF THE INVENTION

Figure 1:
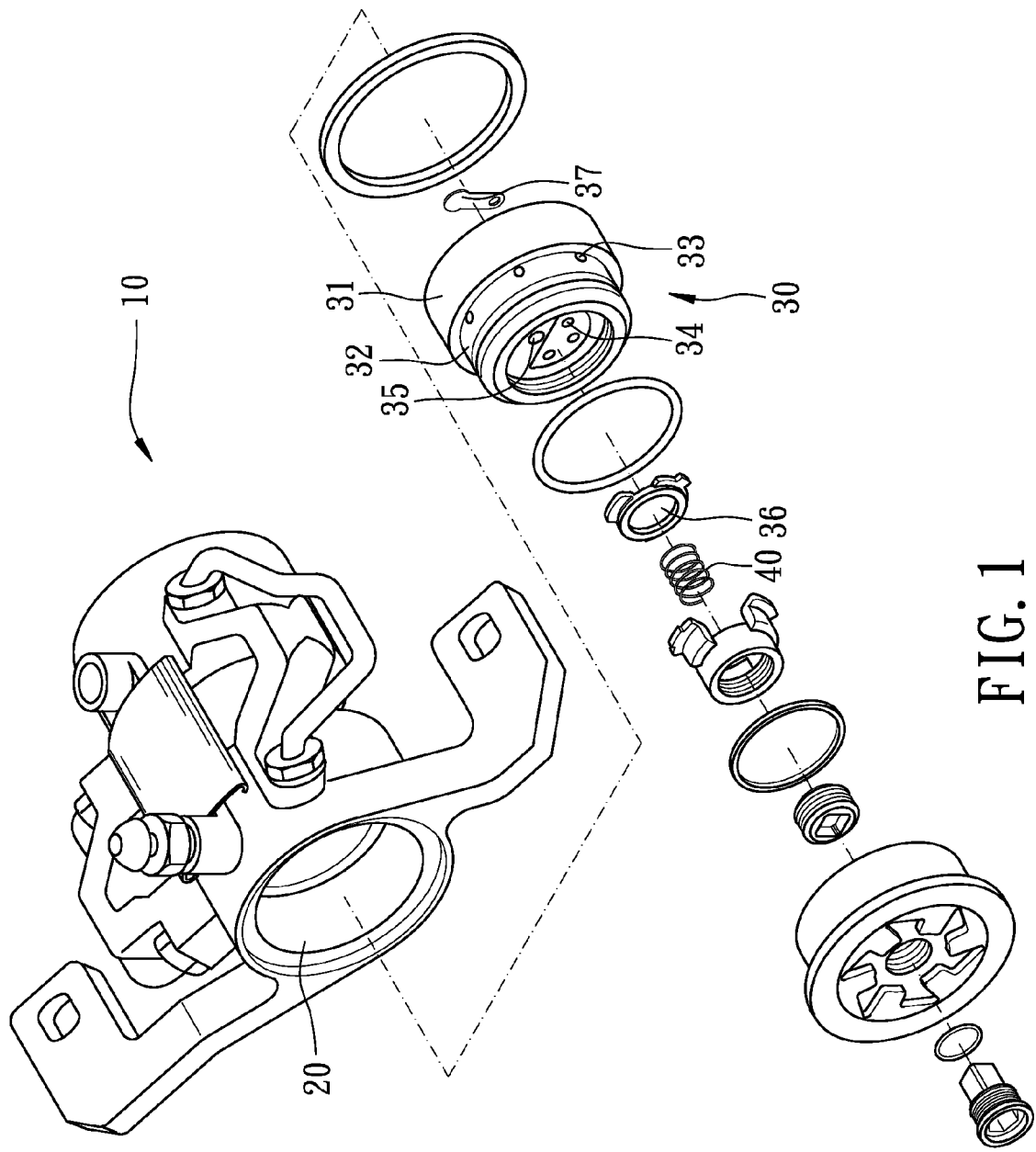
FIG. 1 is an exploded perspective view of a hydraulic cylinder for a brake system in accordance with the present invention.
Figure 2:
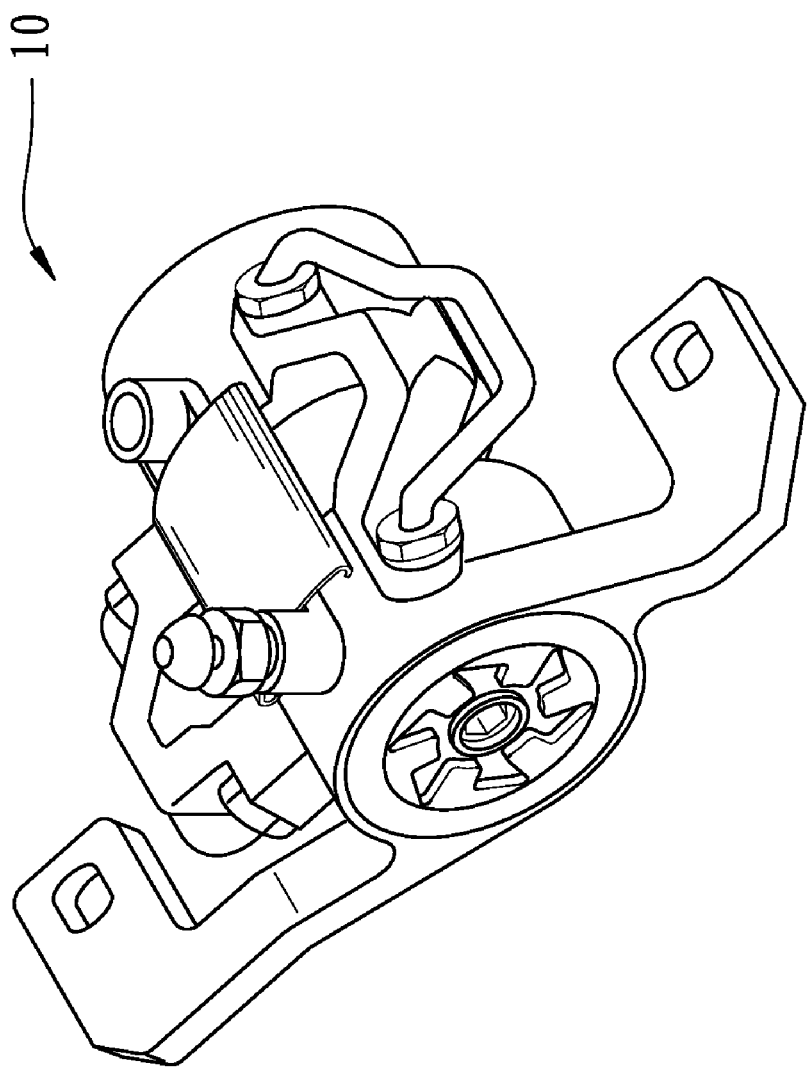
FIG. 2 is an assembled perspective view of the hydraulic cylinder in FIG. 1.
Figure 3:
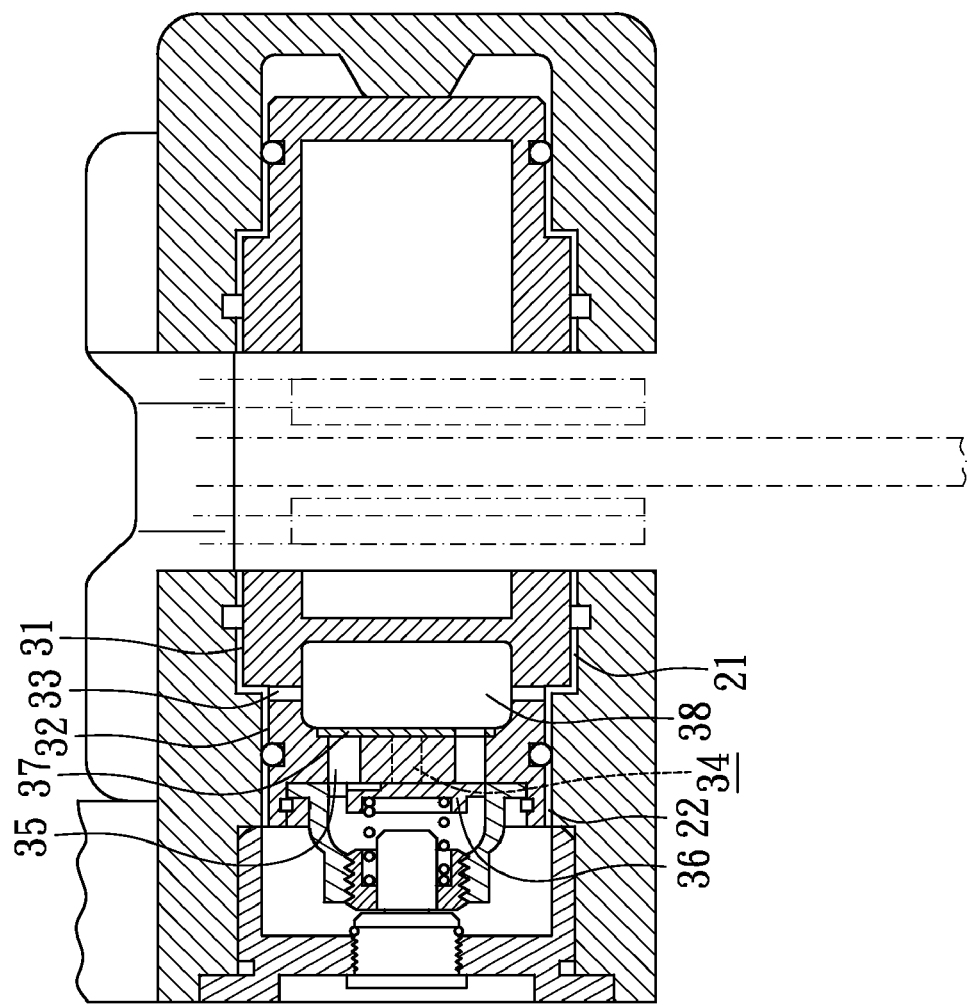
FIG. 3 is a top cross-sectional view of the hydraulic cylinder in FIG. 2.

Referring to the drawings and initially to FIGS. 1-3, a hydraulic cylinder for a brake caliper 10 in accordance with the present invention comprises a first cylindrical body 20 and a first piston 30 sealingly disposed in the first cylindrical body 20. For example, the hydraulic cylinder for a brake system of the present invention is adapted to be used in a bicycle hereinafter.

The first cylindrical body 20 includes a receiving space longitudinally defined therein for movably and sealingly receiving the first piston 30. The receiving space is divided into a first chamber 21 and a second chamber 22 due to the diameters thereof, wherein the first chamber 21 has a diameter greater than that of the second chamber 22.

The first piston 30 includes a first portion 31 and a second portion 32. The first portion 31 and the second portion 32 sealingly and movably abut against inner peripheries of the first chamber 21 and the second chamber 22 respectively. The first piston 30 includes a closed inner chamber 38 defined therein, at least one through hole 33 defined in an out peripheral of the second portion 32 and radially extended into the inner chamber 38 for communicating with the first chamber 21 and the inner chamber 38, a first hole 34 longitudinally defined in a rear end of the second portion 32 opposite to the first portion 31 and extended into the inner chamber 38, and a second hole 35 longitudinally defined in the rear end of the second portion 32 and extended into the inner chamber 38. The first piston 30 further includes a first check valve 36 corresponding to the first hole 34 and mounted on the rear end of the second portion 32 for selectively opening the first hole 34 and a second check valve 37 corresponding to the second hole 35 and mount in the inner chamber 38 for selectively opening the second hole 35.

The hydraulic cylinder for the brake caliper 10 further comprises an adjusting spring 40 abutting against the first check valve 36 for controlling a threshold of controlling the communication of oil by biasing against the adjusting spring 40. Generally the first check valve 36 is closed to seal the first hole 34. When the oil pressure in the inner chamber 38 is greater than a spring force acting on the first check valve 36, the first check valve 36 will open to cause the oil flow into the second chamber 22. Therefore the threshold is adjustable by biasing the adjusting spring 40 to adjust the spring force. The second check valve 37 is a monodirectional valve and generally the second valve 37 is closed to seal the second hole 35. When the oil pressure in the second chamber 22 is greater than the oil pressure in the inner chamber 38, the second valve 37 will open to cause the oil flow into the inner chamber 38.

Figure 4:
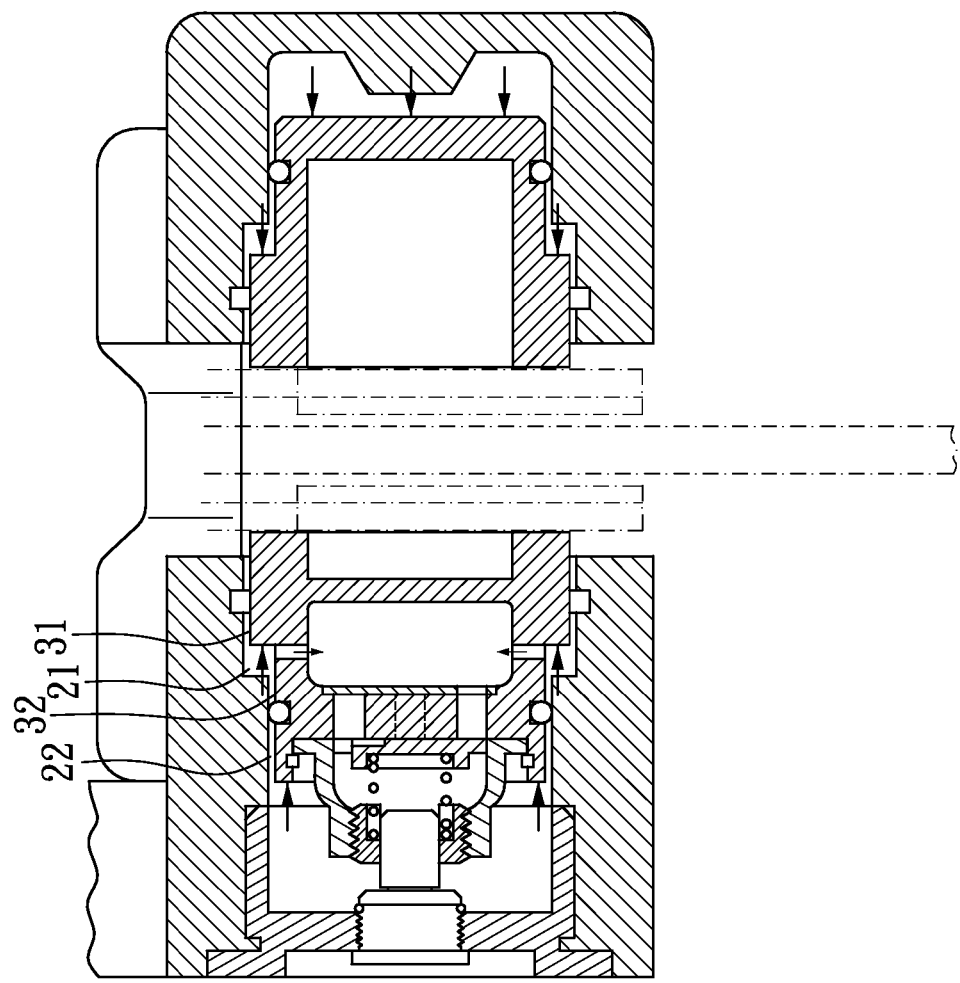
FIG. 4 is a cross-sectional view of the hydraulic cylinder showing a speed reduction stage.
Figure 5:
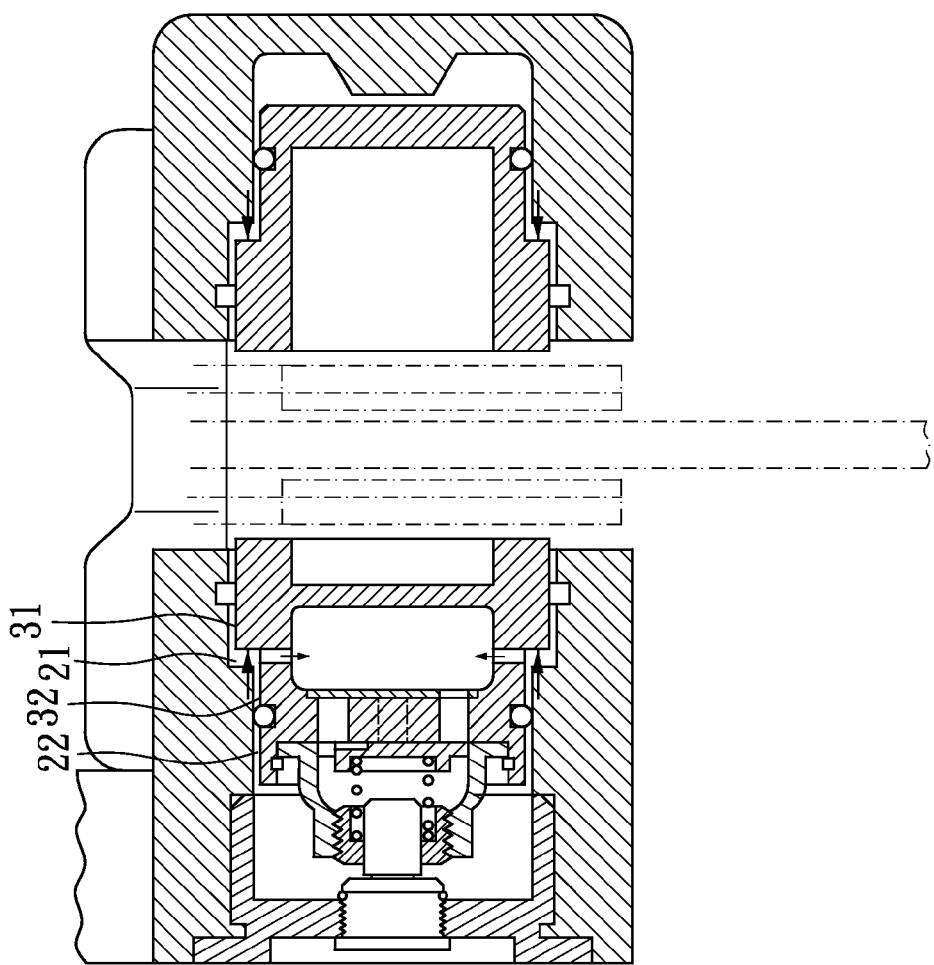
FIG. 5 is a cross-sectional view of the hydraulic cylinder showing an emergency brake stage.

Referring to FIGS. 4-5, the operation of the hydraulic cylinder for the brake caliper 10 in accordance with the present invention is illustrated. In a speed reduction stage as shown in FIG. 4, the oil fed from a oil container flows into the first chamber 21 and then through the at least one through hole 33 into the inner chamber 38. The first piston 30 is pushed outward by the oil pressure to achieve the purpose of slowing down. In the meanwhile the oil pressure in the inner chamber 38 is smaller than the spring force acting on the first check valve 36 so that the first check valve 36 closes the first hole 34.

When needing an emergency brake, the rider applies more force on the brake lever. Therefore the oil pressure in the inner chamber 38 is raised and greater than the spring force acting on the first check valve 36 so that the first check valve 36 is opened to activate an emergency brake stage as shown in FIG. 5. The oil flows into the second chamber 22 so the first piston 30 is pushed outward by the oil pressure for providing a greater braking force than in the speed reduction stage to achieve the purpose of emergency brake. When releasing the brake lever, the oil pressure in the second chamber 22 is greater than the oil pressure in the inner chamber 38 so that the second check valve 37 opens. By opening the second check valve 37, the oil returns to the inner chamber 38 and the oil container through the at least one through hole 33 and the first chamber 21.

Figure 6:
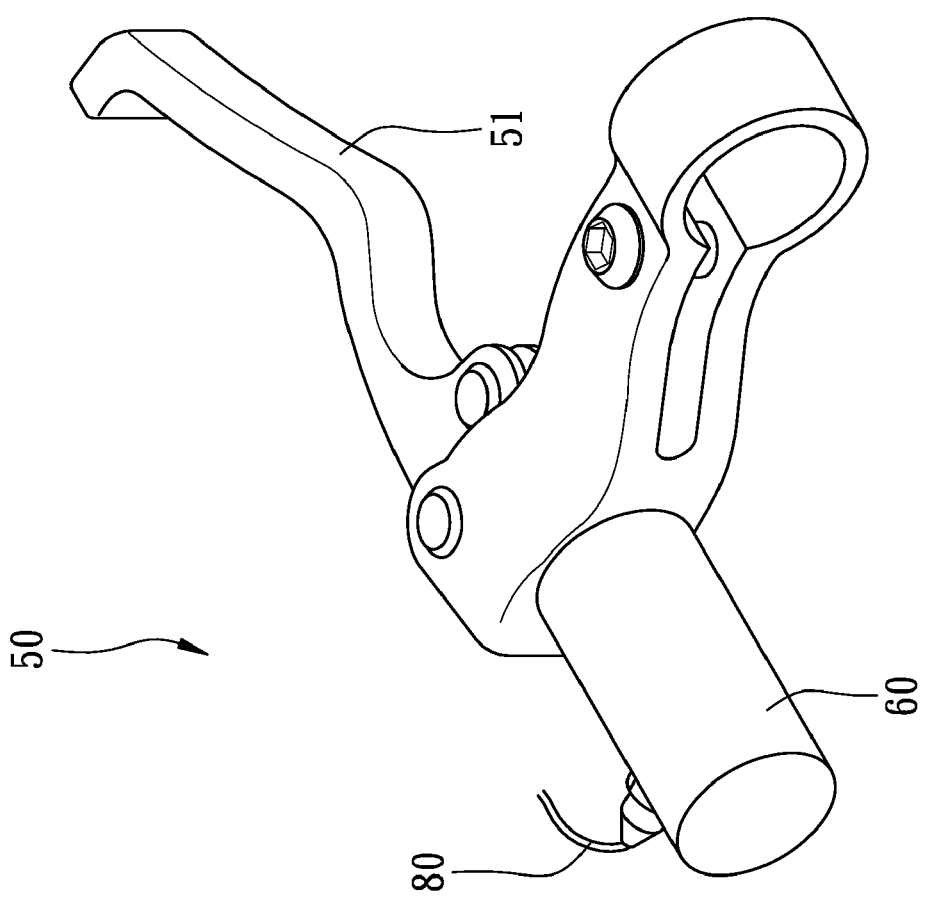
FIG. 6 is a perspective view of a second embodiment of the hydraulic cylinder for a brake system in accordance with the present invention.
Figure 7:
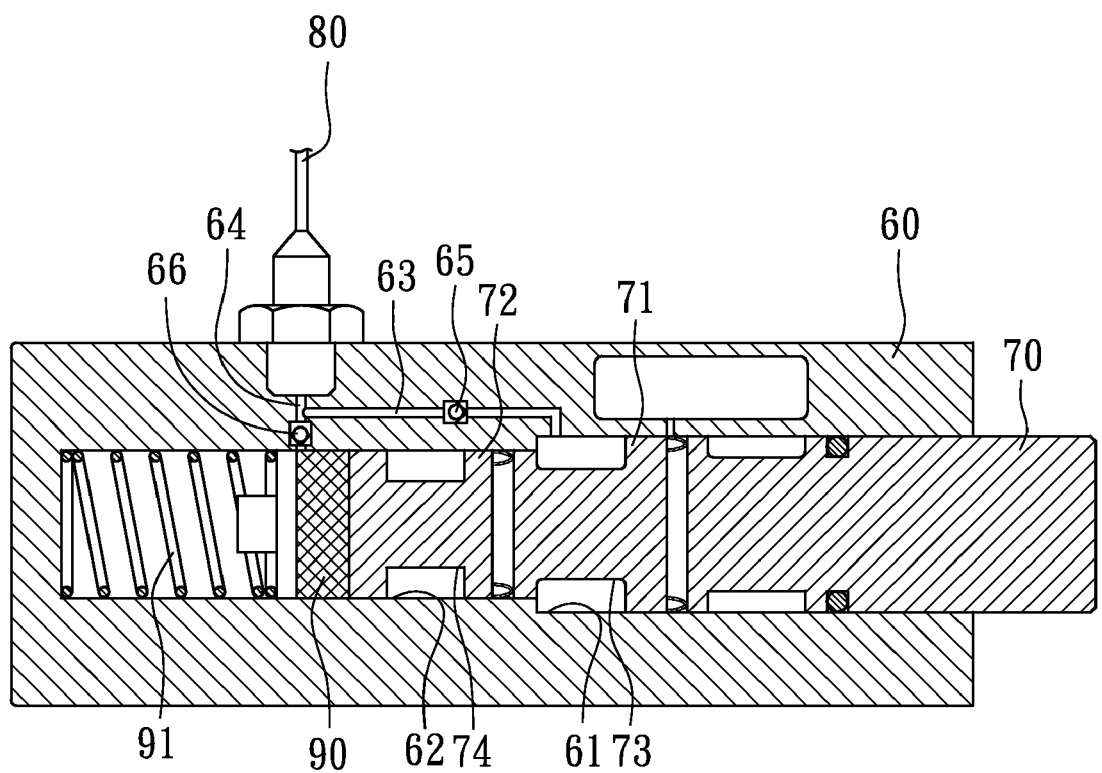
FIG. 7 is a partial cross-sectional view in FIG. 6 showing the hydraulic cylinder.

Referring to FIGS. 6-7 show a second embodiment of a hydraulic cylinder in accordance with the present invention, in this embodiment, the hydraulic cylinder is used for a brake lever 50. The hydraulic cylinder for the brake lever 50 comprises a second cylindrical body 60 and a second piston 70 sealingly and movably disposed in the second cylindrical body 60.

The second cylindrical body 60 includes a receiving space longitudinally defined therein for receiving the second piston 70 sealingly. The receiving space is divided into a first chamber 61 and a second chamber 62 that has a diameter smaller than that of the first chamber 61. The second cylindrical body 60 includes a first channel 63 defined therein for communicating with the first chamber 61 and an oil tube 80 partially mounted in the second cylindrical body 60 to connect to a brake caliper and a second channel 64 for communicating with the second chamber 62 and the oil tube 80, wherein the second channel 64 is defined in the second cylindrical body 60. The second cylindrical body 60 includes a first check valve 65 disposed in the first channel 63 and a second check valve 66 disposed in the second channel 64 for controlling the communication of oil. The first check valve 65 and the second check valve 66 are monodirectional valves to stop the oil from flowing into the receiving space.

The second piston 70 is divided into a first portion 71 and a second portion 72 that has a diameter smaller than that of the first portion 71. The first portion 71 and the second portion 72 sealingly and movably abut against inner peripheries of the first chamber 61 and the second chamber 62 respectively. The second piston 70 includes a first groove 73 annularly formed in a peripheral of the first portion 71 and a second groove 74 annularly formed in a peripheral of the second portion 72. The first groove 73 communicates with the first channel 63.

The hydraulic cylinder for the brake lever 50 further comprises a feed seal 90 disposed in the second chamber 62 and abutted against a rear end of the second portion 72 opposite to the first portion 71 for sealing the second channel 64 movably and a return spring 91 compressively disposed in the second chamber 62. One end of the return spring 91 is fixed in the second chamber 62 and the other end abuts the feed seal 90. The return spring 91 pushes the feed seal 90 back for keeping sealing the second channel 64 when the feed seal 90 is biased against the return spring 91.

In a speed reduction stage, the second piston 70 is pushed by a lever 51 so that the oil is fed from the first groove 73 to the first channel 63 and then through the oil tube 80 into the caliper for providing an oil pressure to achieve the purpose of slowing down. In the meanwhile, the second check valve 66 will stop the oil from flowing into the second chamber 62 and the feed seal 90 will stop the oil from flowing into the second channel 64.

When needing an emergency brake, the rider applies more force on the lever 51. Therefore the second piston 70 is pushed to move until the second groove 74 connected to the second channel 64 to activate an emergency brake stage. In the emergency brake stage, the oil is feed from the second groove 74 to the second channel 64 and then through the oil tube 80 into the caliper for providing a higher oil pressure than in the speed reduction stage to achieve the purpose of emergent braking. In the meanwhile, the first check valve 65 stops the oil from flowing into the first chamber 61 and the feed seal 90 leaves the second channel 64 and bias against the return spring 91. When releasing the lever 51, the return spring 91 pushes the feed seal 90 back for keeping sealing the second channel 64 to end the emergency brake stage.

Although the invention has been explained in relation to its preferred embodiment, it is to be understood that many other possible modifications and variations can be made without departing from the spirit and scope of the invention as hereinafter claimed.

What is claimed is:

1. A hydraulic cylinder for a brake caliper, comprising:
    a cylindrical body having a receiving space longitudinally defined therein for movably and sealingly receiving a piston, the receiving space divided into a first chamber and a second chamber diametrically smaller than the first chamber; and
    the piston including a closed inner chamber defined therein, the piston having a first portion and a second portion, the first portion and the second portion sealingly and movably abutted against the first chamber and the second chamber respectively, the second portion having at least one through hole defined in an outer peripheral thereof for communicating the first chamber with the closed inner chamber of the piston; a first hole and a second hole defined in the second portion for oil communicating;
    whereby the first portion interacts with the first chamber in a speed reduction stage, and the first portion and the second portion interact with the first chamber and the second chamber respectively in an emergency brake stage.

2. The hydraulic cylinder for the brake caliper as claimed in claim 1, wherein the piston further includes a first check valve corresponding to the first hole and a second check valve corresponding to the second hole for controlling the communication of oil.

3. The hydraulic cylinder for the brake caliper as claimed in claim 2 further comprising an adjusting spring abutted against the first check valve for controlling a threshold of activating the emergency brake stage.

4. A hydraulic cylinder for a brake lever, comprising:
    a cylindrical body having a receiving space longitudinally defined therein for movably and sealingly receiving a piston, the receiving space divided into a first chamber and a second chamber diametrically smaller than the first chamber; the cylindrical body having a first channel defined therein for communicating with the first chamber and a second channel defined therein for communicating with the second chamber; and
    the piston having a first portion and a second portion, the first portion having a first groove annularly formed in a peripheral thereof, the second portion having a second groove annularly formed in a peripheral thereof; the first portion and the second portion sealingly and movably abutted against the first chamber and the second chamber respectively, whereby the first portion interacts with the first chamber and the oil is fed from the first groove to the first channel in a speed reduction stage; in an emergency brake stage, the second portion interacts with the second chamber and the oil is fed from the second groove to the second channel.

5. The hydraulic cylinder for the brake lever as claimed in claim 4, wherein the cylindrical body includes a first check valve disposed in the first channel and a second check valve disposed in the second channel for controlling the communication of oil.

6. The hydraulic cylinder for the brake lever as claimed in claim 4 further comprising a feed seal disposed in the second chamber and abutted against one end of the second portion for sealing the second channel movably.

7. The hydraulic cylinder for the brake lever as claimed in claim 6 further comprising a return spring disposed in the second chamber, wherein one end of the return spring is fixed in the second chamber and the other end is near to the feed seal, the return spring pushes the feed seal back for keeping sealing the second channel as the feed seal biased against the return spring.

* * * * *